US007844301B2

(12) United States Patent
Lee et al.

(10) Patent No.: US 7,844,301 B2
(45) Date of Patent: Nov. 30, 2010

(54) METHOD FOR DISPLAYING MULTIMEDIA CONTENTS AND MOBILE COMMUNICATIONS TERMINAL CAPABLE OF IMPLEMENTING THE SAME

(75) Inventors: Sang-Hyuck Lee, Seoul (KR); Jee-Young Cheon, Seoul (KR); Yeon-Woo Park, Seoul (KR)

(73) Assignee: LG Electronics Inc., Seoul (KR)

( * ) Notice: Subject to any disclaimer, the term of this patent is extended or adjusted under 35 U.S.C. 154(b) by 259 days.

(21) Appl. No.: 11/546,410

(22) Filed: Oct. 12, 2006

(65) Prior Publication Data

US 2007/0085759 A1  Apr. 19, 2007

(30) Foreign Application Priority Data

Oct. 14, 2005  (KR) .................. 10-2005-0097136
Nov. 11, 2005  (KR) .................. 10-2005-0108246

(51) Int. Cl.
*H04B 1/38* (2006.01)

(52) U.S. Cl. .................. 455/566; 345/1.1; 379/93.23

(58) Field of Classification Search .................. 455/566; 348/14; 379/93.23; 345/1.1, 1.3, 901, 903
See application file for complete search history.

(56) References Cited

U.S. PATENT DOCUMENTS

| 6,069,648 | A  | * | 5/2000 | Suso et al. ............... 348/14.02 |
| 6,262,785 | B1 | * | 7/2001 | Kim ........................... 349/58 |
| 6,473,058 | B1 | * | 10/2002 | Hotomi et al. ............... 345/1.1 |
| 6,630,937 | B2 | * | 10/2003 | Kallergi et al. .............. 345/619 |
| 7,003,328 | B2 | * | 2/2006 | Kuwazoe .................... 455/566 |
| 7,043,276 | B2 | * | 5/2006 | Kokubo ...................... 455/566 |
| 7,095,387 | B2 | * | 8/2006 | Lee et al. ....................... 345/4 |
| 7,127,684 | B2 | * | 10/2006 | Morita et al. ............... 715/781 |
| 7,174,195 | B2 | * | 2/2007 | Nagamine ................. 455/575.1 |
| 7,200,423 | B2 | * | 4/2007 | Bum ........................... 455/566 |
| 7,409,231 | B2 | * | 8/2008 | Oba et al. .................... 455/566 |
| 7,411,579 | B2 | * | 8/2008 | Tsuji et al. .................. 345/158 |
| 2002/0018027 | A1 |  | 2/2002 | Sugimoto |
| 2004/0008218 | A1 |  | 1/2004 | Hong |

(Continued)

FOREIGN PATENT DOCUMENTS

EP       0-898-223 A2    2/1999

(Continued)

*Primary Examiner*—Yuwen Pan
(74) *Attorney, Agent, or Firm*—Birch, Stewart, Kolasch & Birch, LLP (57) ABSTRACT

The invention is directed to a method of displaying multimedia data and providing multitasking features and a mobile communications terminal capable of implementing the same; and cradle for the mobile communications terminal. A mobile communications terminal includes a transceiver, a memory, a first display unit, a second display unit, a processor, a sensor to detect a rotational movement of a body, and a cradle for displaying multimedia contents is provided. The display unit can display the multimedia data in a fixed viewing angle regardless of which direction a user rotates the terminal. A method comprises the steps of displaying multimedia data playback on at least one of a first and a second display screens, displaying information related to the multimedia data, on at least a portion of the at least one of the display screens, providing multimedia control functions and/or indications to the user in a minimally intrusive manner, and displaying a multimedia playback control menu on the at least one of the two display screens.

12 Claims, 12 Drawing Sheets

U.S. PATENT DOCUMENTS

| | | |
|---|---|---|
| 2004/0067770 A1 | 4/2004 | King et al. |
| 2005/0040753 A1 | 2/2005 | Osame et al. |
| 2005/0070327 A1 | 3/2005 | Watanabe |
| 2005/0083642 A1* | 4/2005 | Senpuku et al. ............. 361/681 |
| 2005/0143124 A1 | 6/2005 | Kennedy et al. |
| 2005/0170869 A1 | 8/2005 | Slemmer et al. |
| 2006/0116164 A1* | 6/2006 | Kang .......................... 455/557 |

FOREIGN PATENT DOCUMENTS

| | | |
|---|---|---|
| EP | 1 424 838 A2 | 6/2004 |
| GB | 2 378 032 A | 1/2003 |
| KR | 2001-027-666 A | 4/2001 |
| KR | 20-0266509 Y1 | 2/2002 |
| KR | 20040044829 A | 5/2004 |
| KR | 20050056901 A | 6/2005 |
| WO | WO-02/093879 A1 | 11/2002 |

* cited by examiner

METHOD FOR DISPLAYING MULTIMEDIA CONTENTS AND MOBILE COMMUNICATIONS TERMINAL CAPABLE OF IMPLEMENTING THE SAME

BACKGROUND OF THE INVENTION

1. Field of the Invention

The present invention is directed to a method for displaying multimedia contents, a mobile communications terminal capable of implementing the method, and cradle for the mobile terminal. Specifically, the invention relates to a method of changing an image view between a portrait view and a landscape view and displaying multitasking related information, and the mobile communications terminal capable of implementing the same.

2. Background of the Related Art

A mobile communications terminal has been proliferated and become one of the must have gadgets in a modern society as a numerous information and telecommunications industries are facing abrupt changes. Caused by increasing demands from users of the mobile terminals, the mobile communications terminal has been developed to provide various functions in addition to a conventional voice communications.

Recently, a mobile terminal capable of displaying multimedia contents (e.g., MP3 files, various still or video image files) has been developed and contemporary users of the mobile terminals has been accustomed to enjoy the multimedia contents regardless of locations. In accordance with the modern trend, the latest mobile terminal may provide not only a simple voice telephone function, but also a range of extra functions such as a game, a video-on-demand (VOD), Television broadcasting, electronic dictionary, and MP3 player.

Also, the modern users start demanding a multitasking function for all the available functions provided by their mobile terminals. Especially, it is highly solicited that more convenient user interface should be available to the users to easily enjoy the multimedia contents.

However, traditional mobile communications terminals providing the multimedia playback may only provide a display screen showing an image view orientation fixed with respect to the display screen in such a way that the screen image can't change from the portrait view to the landscape view when the user of the terminal rotates the body of the terminal from a portrait viewing angle to a landscape view angle, or vice versa. Namely, the traditional mobile communications terminals can simply display the screen image fixed with respect to the body of the terminals. The lack of providing a plurality of viewing ratios or aspects may not sufficiently satisfy needs of the users who wish to enjoy their visual entertainment in a various viewing ratios or aspects.

In addition, the current mobile terminals may not amply provide a user-friendly graphic interface to support a multitasking function for users. For example, when a user receives a Short Message Service (SMS) or Multimedia Messaging Service (MMS) message when playing a multimedia file in a folder-type or slider type mobile communications terminal, a screen displaying the multimedia playback may automatically be switched to display the SMS or MMS message after temporarily stopping the multimedia playback.

Furthermore, the mobile terminal user desires to enjoy the multimedia contents without worrying about a quick battery drain due to the fact that the multimedia playback in the mobile terminal tends to consume massive battery power.

SUMMARY OF THE INVENTION

The present invention provides a mobile terminal having at least two display screens and providing multimedia control functions and/or indications to the user in a minimally intrusive manner such that it can provide various viewing aspect ratios or viewing modes for displaying the multimedia contents in the mobile terminal, and the method thereof. In addition, the present invention provides an external control unit including an additional power supplying unit, an input unit to allow a user to enter at least one command to display the multimedia data, and a connector to be connected to a data port of the wireless communication apparatus to further control the multimedia such that the terminal can further provide media control functions and/or indications to the user in a minimally intrusive manner.

BRIEF DESCRIPTION OF THE DRAWINGS

The present invention will be described by the accompanying drawings that illustrate various exemplary embodiments. The illustrated embodiments are simply examples of the present invention and do not limit the scope thereof.

FIGS. 3 A and B show exemplary views of the mobile terminal displaying multimedia contents on dual display screens in accordance with one embodiment of the present invention;

FIGS. 10 A through D depict exemplary views showing a process of handling an event message during displaying the multimedia contents according to an embodiment of the present invention;

FIGS. 11 A through D show an exemplary process of sending the message of FIG. 10 during the multimedia display;

DETAILED DESCRIPTION OF PREFERRED EMBODIMENTS

One aspect of the present invention relates to the recognition by the present inventors about the problems of the related art as described above, and further explained hereafter.

Figure 1:
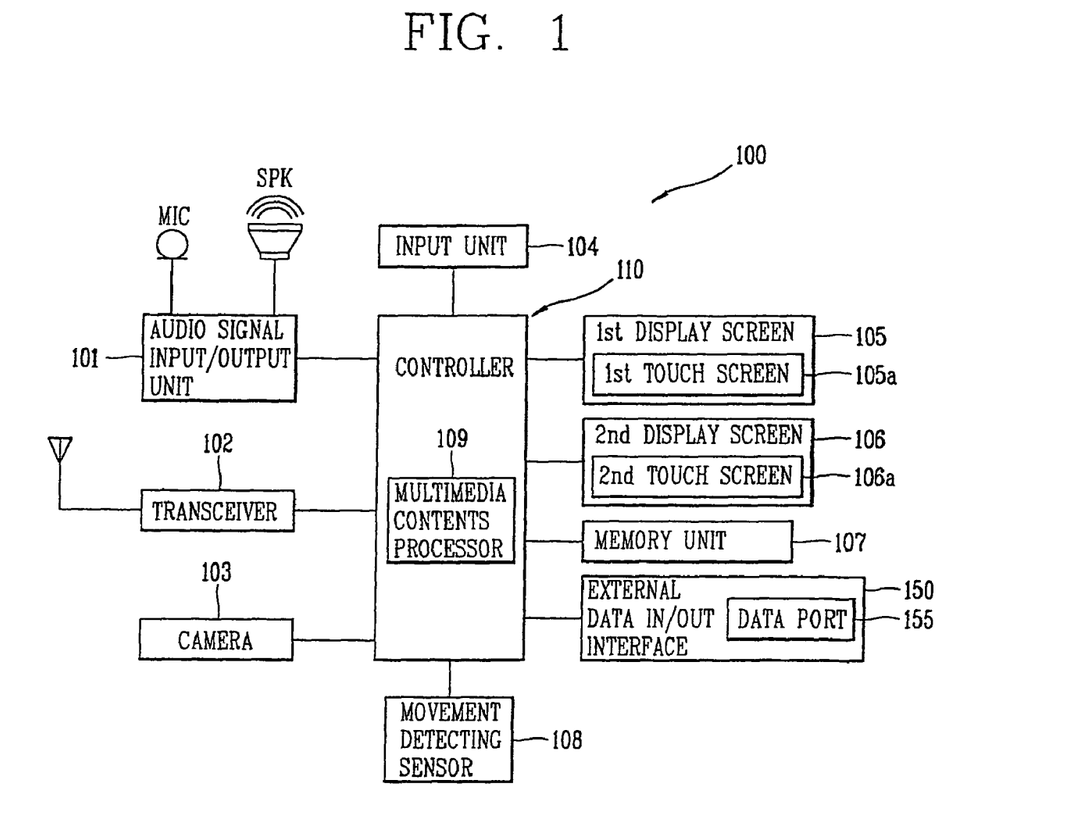
FIG. 1 shows an explanatory diagram of a mobile terminal in accordance with an embodiment of the present invention.

FIG. 1 shows an explanatory diagram of a mobile terminal in accordance with an embodiment of the present invention. The mobile terminal 100 can comprise a controller or processor 110, an input unit (e.g., key pads, key buttons, touch pads, and others) 104, a transceiver 102, an audio signal input/output unit (e.g., mike, speaker and so forth) 101, and an image capturing unit (i.e. camera) 103 as shown FIG. 1. A detailed exemplary perspective view of the mobile terminal in accordance with an embodiment of the present invention can be further illustrated in FIG. 2. Here, the mobile terminal is a mobile phone, but the scope of the invention may be related to any mobile terminal or device, including a PDA, a notebook computer, Ultra Mobile PC (UMPC), and so forth. The mobile terminal may be operable in a plurality of wireless networks including WI-FI, WLAN, WIBRO, WIMAX, BREW, 3G networks and the like because certain concepts and features thereof are common to those of the present invention, and thus allow implementation in various types of communications schemes.

Figure 2:
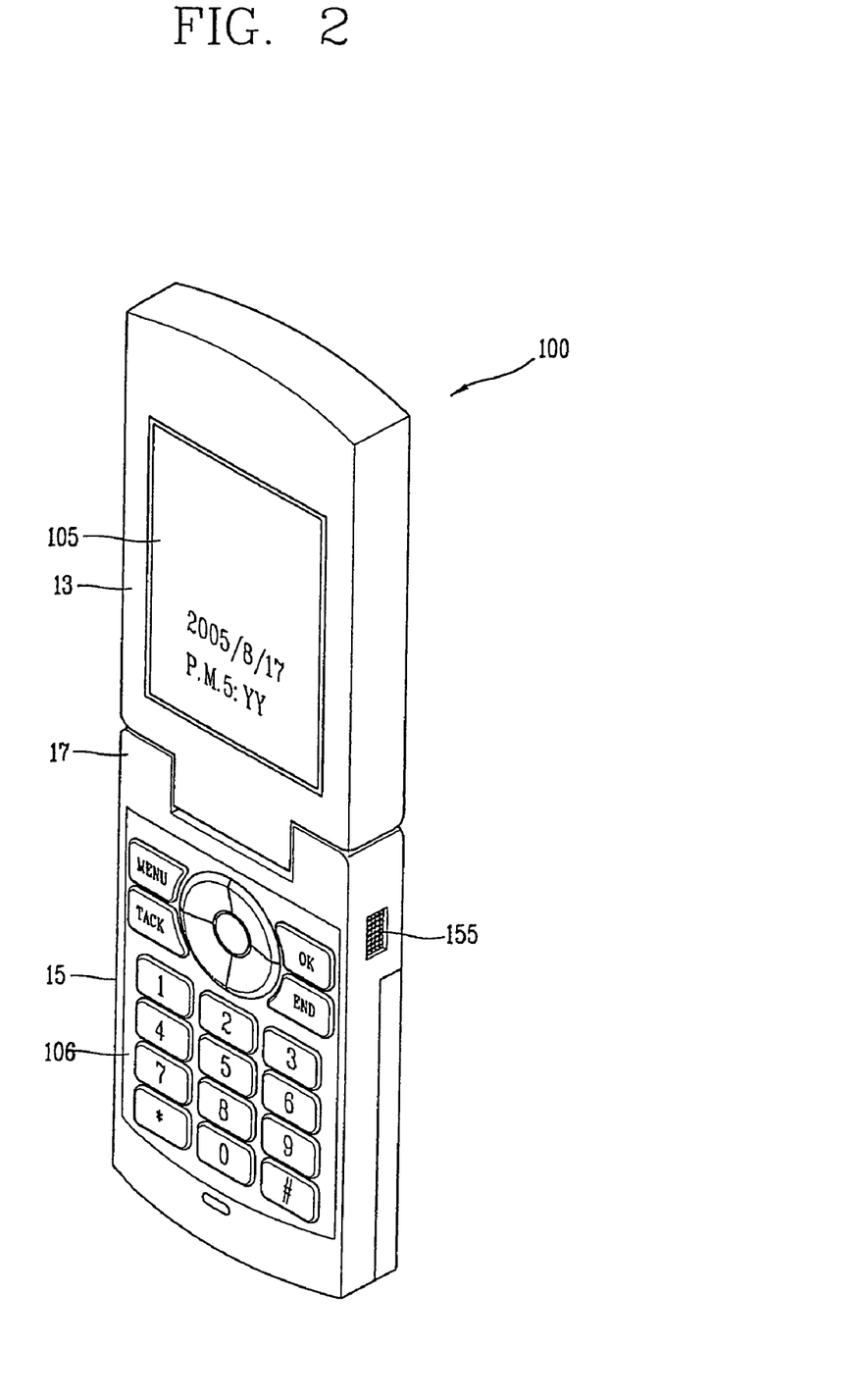
FIG. 2 is an exemplary perspective view of the mobile terminal in accordance with an embodiment of the present invention.

FIG. 2 shows the mobile terminal 100 comprising a first body 13 that includes a first display screen 105, and a second body 15 including a second display screen 106 and a data port (i.e., terminal or connector) 155. Here, the mobile terminal is a folder type comprising the first body 13, the second body 15 and a hinge or connector portion 17, wherein the first and second bodies are movable relative to each other and are configured to have a same display orientation. However, the scope of the present invention is not intended to be limited to any particular embodiment such as the folder type phone as described above. Moreover, the scope of the present invention may not be limited to any specific kind of the mobile terminal, and other various body types (e.g., bar type, slider, swivel, and others) can be considered to include the essential features of the present invention described in this. The data port 155 can be arranged at not only the second body 15, but also the first body 13 or the hinge portion 17.

The mobile terminal 100 can further comprise a position or movement (i.e., rotation or motion) detecting sensor 108, an external data in/out interface unit 150, memory or storage unit 107 and a controller 110 as shown in FIG. 1 in accordance with one embodiment of the present invention. The mobile terminal 100 may not be limited to comprise the elements described above, but also include many other limitations known in the art which are not shown or described in this. The input unit 104, the position or movement (i.e. rotation, motion) detecting sensor 108, the external data in/out interface unit 150, the memory or storage unit 107, or the controller 110 can be implemented either in the first body 13 or the second body 15. Also, the connector portion 17 can be configured to be arranged between the first body 13 and the second body 15 such that the first body 13 is flush with the second body 15 when the mobile terminal is fully opened (180 degree) as shown in FIG. 2. This continuous and flush open configuration of the mobile terminal can allow a user to enjoy multimedia contents in a flat TV like impression.

The external data in/out interface unit 150 may allow the mobile terminal 100 to be connected to an external device (not shown) via the data port 155. In particular, the external data in/out interface unit 150 can allow the mobile terminal 100 to be connected to a cradle 200 which can be described fully later in accordance with another embodiment of the present invention. In addition, the external data in/out interface unit 150 may allow the user to connect the mobile terminal 100 with an external audio output device (e.g., headphone, earphone, speaker and others) to output sound signals. The audio output device can be external to the mobile terminal or integrally implemented within the mobile terminal.

The memory unit 107 can store a plurality of operational programs and data, and particularly multimedia contents or data. The memory unit 107 can be an internal memory type or external memory type. The scope of the present invention is not intended to be limited to above two types of memory unit to store data described herein. The controller 110 can monitor and control overall operations of the mobile terminal 110 and in particularly, can control a playback of the multimedia contents on the display screens 105, 106 in accordance with one embodiment of the present invention. Furthermore, the controller 110 can control the display of the multimedia contents stored in the memory unit 107 or the contents received via the transceiver 102. In addition, the controller 100 can include a multimedia content processor 109 that can be either integrally arranged (i.e., implemented in a same hardware configuration) in the processor 110 or separate entity from the controller.

The mobile terminal of the present invention provides the above-described features and advantages, and is capable of displaying or playing the multimedia contents or any necessary information to operate the mobile terminal on the first display screen 105 or the second display screen 106. The scope of the present invention can include the mobile terminal comprising the above-described features or advantages, but also other features (e.g., Digital Multimedia Broadcasting (DMB) or Digital Video Broadcasting-Handheld (DVB-H) broadcast receiver modules). Other communications or multimedia features can be also implemented and are within the scope of the present invention.

In accordance with some embodiments of the invention, the mobile terminal can include a sensor 108 to detect a motion (i.e., rotational movement) of a body of the mobile terminal, the sensor in cooperation with the controller 110 to detect the body orientation of the mobile terminal and change a display orientation of the two display screens 105, 106 as the user rotates the entire body of the terminal from vertical to horizontal direction or vice versa. The sensor 108 can comprise a position detecting sensor, geomagnetic sensor, and others and detect whether the mobile terminal rotates from the horizontal orientation to the vertical one or vice versa to change the display orientation on at least one of the dual display screens 105, 106 accordingly.

Also, the mobile terminal 100 can comprise the first display screen 105 to display general mobile terminal operations, multimedia contents, and information regarding those operations and the contents, and the second display screen 106 to perform input unit function (i.e., touch sensitive screen) and display various information and data. The first display screen 105 and the second display screen 106 can exchange each other's role (i.e., the first display screen 105 including the input unit function) and other various configurations of the display screens can be implemented and are within the scope of the present invention.

The above-described first display screen 105 and second screen 106 can be implemented in a same hardware configuration (i.e., one big display screen being partitioned to have separate display region) or be implemented as the separate independent units respectively. In accordance with some embodiments of the present invention, at least one display screen can be allocated to perform the input unit function by incorporating the touch sensitive screen. The input unit can be conventional key input units as understood by one skilled in the art and separately arranged from the display screens.

The above-described controller 110 controls the overall internal operation of the mobile terminal and can further control the display operation of the display screens 105 or 106.

In accordance with one embodiment of the present invention, the mobile terminal 100 can include the input unit 104 being an independent feature arranged on the body of the terminal or being implemented in the same hardware configuration of the touch sensitive screen of at least one of the display screens 105, 106. When the input unit 104 is implemented as a touch sensitive input unit (i.e., part of the touch sensitive screen), the controller 110 can receive signals inputted by the touch sensitive input unit 104 and expand the screen information displayed on the first display screen 105 to the second display screen 106 (i.e., the second display screen 106 displaying the same screen information of the first display screen 105 simultaneously), or return to the default display by displaying the screen information on only one display screen if the both display screens have been displaying the same. The order of expansion or returning to the default display is not limited to the above-described manner, but any displaying order or process can be within the scope of the present invention.

According to some embodiments of the present invention, the input unit 104 can comprise one of the group including a touch wheel, a touch pad, a jog dial, a jog shuttle, a key pad and so forth. As described earlier, the input unit 104 can be independently arranged on the body of the terminal or be implemented together with the above-described touch sensitive screen of the display screen. The other different configurations of the input unit layout can be within the scope of the present invention.

In accordance with one embodiment of the present invention, the input unit 104 can be implemented as the touch sensitive input unit on at least one of the dual display screens 105, 106, and details can be described below.

Figure 3A:
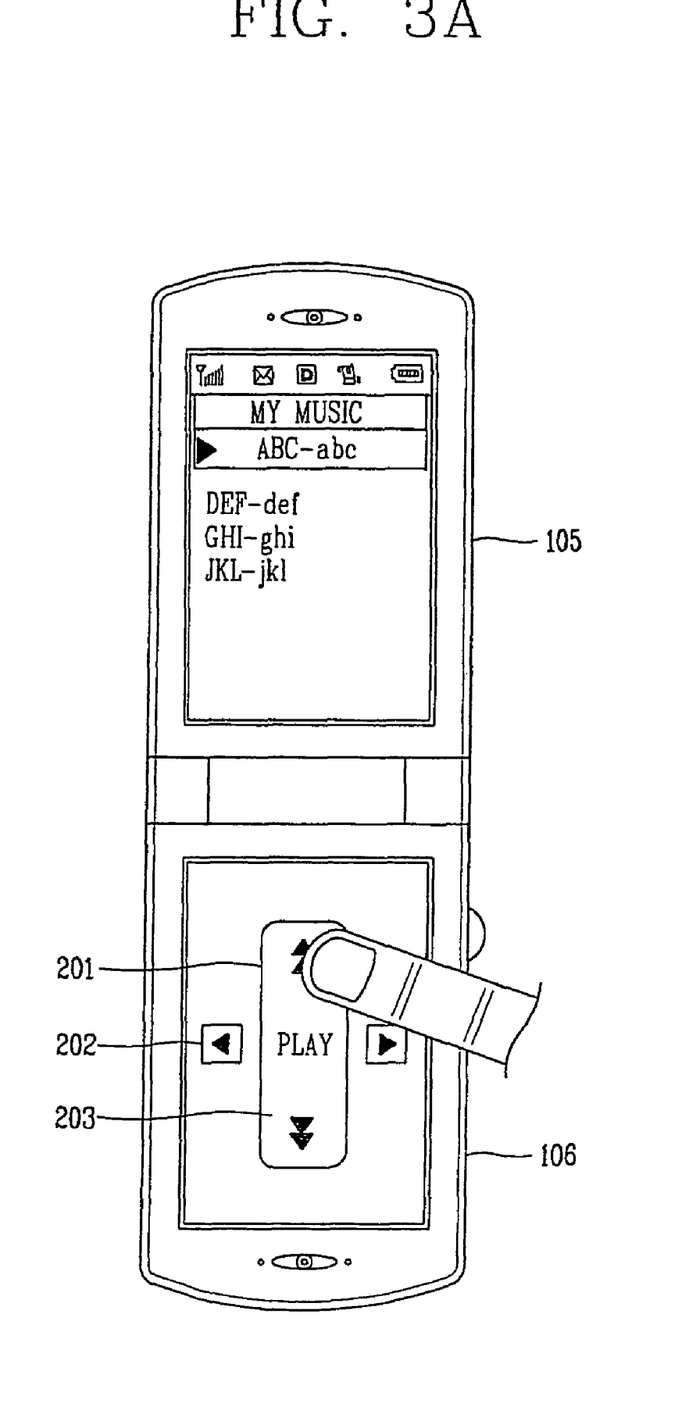
Figure 3B:
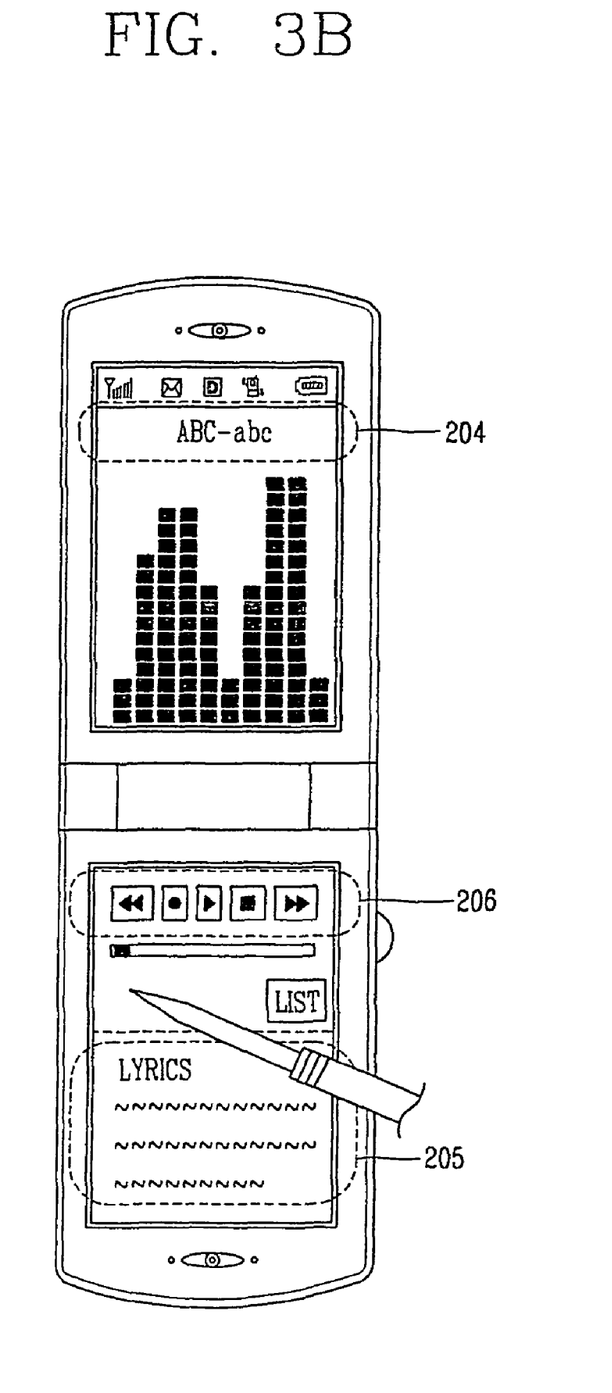

FIGS. 3A, B are exemplary views of the mobile terminal displaying multimedia contents on dual display screens 105, 106 in accordance with one embodiment of the present invention. The example of the embodiment of the present invention is directed to a music playback method, but an animation, a movie, photographic information and other media contents can be still within the scope of the present invention.

As shown in FIG. 3A or B, in accordance with an embodiment of the present invention, the first display screen 105 can display information regarding the multimedia playback function (e.g., various icons representing "Play", "Stop", "Record", "Erase", "Previous Song", "Next Song", and so forth) and information with respect to the multimedia contents (e.g., an artist name, a song title and a lyrics for each MP3 file; and a movie title, a subtitle and other text information for each movie file) (as used below, the information regarding the multimedia playback function and the information about the multimedia contents can be referred to as the information regarding the multimedia).

First, FIG. 3A is an exemplary view showing the process of selecting a music file, FIG. 3B is an exemplary view showing the process of performing the playback or play function for the selected file as described above, each figure showing the mobile terminal displaying the information regarding the multimedia in a conventional manner, a vertical display orientation. As shown in FIG. 3A, the first display screen 105 can display a list of music files and the second display screen 106 can display the menu screen for controlling the playback of the music files. In a general call mode, the second display screen 106 displays images of conventional keys or buttons for a voice call (e.g., "Talk", "End", "Menu" and numeric key pads) as shown in FIG. 2. However, in the multimedia play mode, the second display screen 106 can display images of keys or buttons (e.g., Up/Down Scroll Bar, Forward, Reverse or rewind, Play and so forth) for controlling the playback of the multimedia contents instead of the images in the general call mode. In addition, the control menu images on the second display screen 106 can provide a visual, audible or tactile feedback to echo each touch input of the user (i.e., highlighting each key or button image whenever the user touches it).

A Up/down scroll bar 201 allows the user to select a desired song from a music file list displayed on the first display screen 105 by moving a cursor up or down, and the user can use a Left/Right buttons 202 to move between different groups or folders to find a desired folder or to perform a fast/forward or rewind (reverse) forward of the selected music file. The user can touch or push a Play button 203 to run or play the selected music file. When the user actuates the Pay button 203, the mobile terminal 100 displays the screen information as shown in FIG. 3B.

As illustrated in FIG. 3B, auxiliary information (e.g., title, artist name, writer, and others) 204 regarding the selected music file along with images (or animation) of a music equalizer can be displayed on the first display screen 105, and the second display screen 106 can show more detailed information (e.g., lyrics) 205 regarding the selected music file, a play time (i.e., a present play time), and control menu key or button images (e.g., Play, Stop, Previous, and so forth) 206.

When the mobile terminal is playing a movie file or broadcasting file (e.g., DMB), the first display screen 105 can show the movie or broadcast program and the second display screen 106 can show the control button or key images (e.g., Channel selection, Volume, etc.) analogous to the music file control menu keys or buttons as described above.

Figure 4:
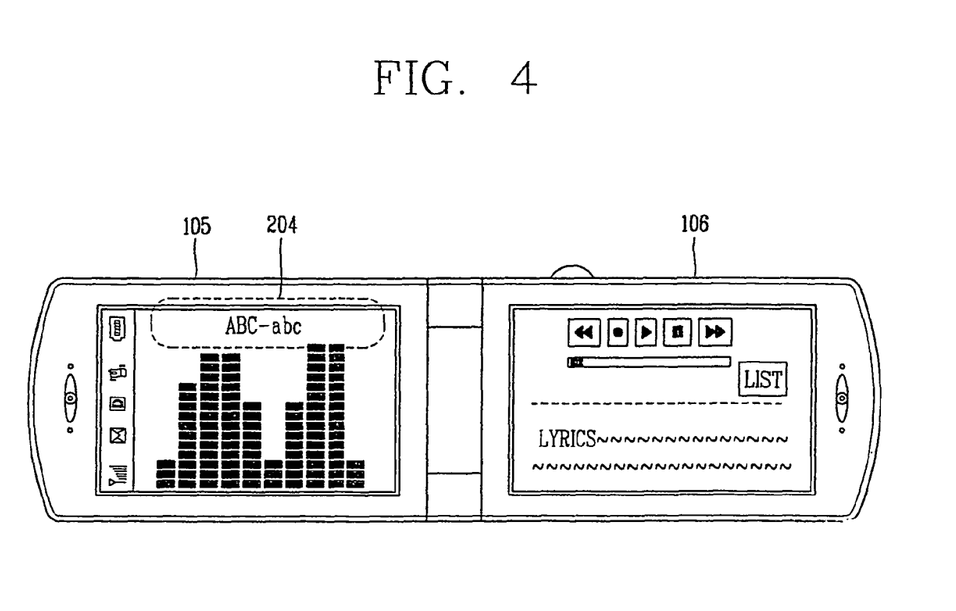
FIG. 4 is an exemplary view of the mobile terminal displaying multimedia contents in another display view in accordance with an embodiment of the present invention.
Figure 5:
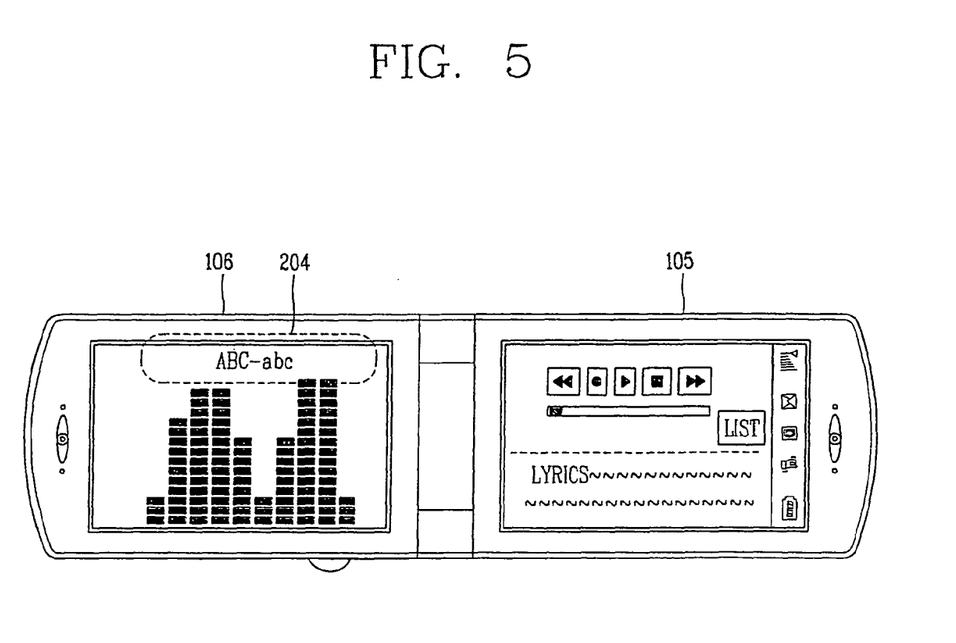
FIG. 5 shows the mobile terminal displaying the multimedia contents in the same manner when the mobile terminal switches its orientation 180° from that of the FIG. 4.

While displaying the screen information as shown in FIG. 3B, the mobile terminal 100 can change a portrait view or a default display (or viewing) orientation (i.e., vertical) to a landscape view or a horizontal one to display the screen information in a wide screen aspect ratio when the movement detecting sensor 108 detects the rotational movement of the entire body of the mobile terminal as shown in FIG. 4. Here, the screen information displayed in the default viewing orientation on the first display screen 105 and the second display screen 106 can be simultaneously rotated in a same direction (e.g., clockwise or counterclockwise) to have the horizontal display direction. The viewing angle orientation change of the display screen can be executed when not only the detecting sensor 108 detects the movement, but also the user actuates a designated input unit for the display orientation change. In particular, the display orientation change can be subject to the number of actuating (or touching, pressing) the designated input unit or how long the user actuates or holds the designated input unit and the positioning sensor or geomagnetic sensor can be used to detect the rotational direction and position as described earlier. The specific input unit for changing the display (viewing angle) orientation can be arranged at not only on the touch sensitive screen of the display screens, but also on any outer surface of the first and second bodies (13, 14). Furthermore, the mobile terminal 100 can rotate the screen information on the display screens 105, 106 from the default display orientation to 90° or −90° (i.e., clockwise or counterclockwise) and each screen information displayed on respective display screen can be swapped as the mobile terminal 100 rotates accordingly. Thus, whichever direction the user rotates the mobile terminal, when the user views the contents, the left side display screen or unit always displays the processed information (equalizer, video or audio information, or streaming video or audio data (e.g. DMB or DVB-H, satellite audio, etc.)), and the right side display unit shows the control menu (e.g., play, record, pause, etc.) or detailed information related to the information displayed on the left side display unit. This feature can accommodate either a left handed or right handed person by selecting the corresponding user preference from the menu.

After the multimedia contents start being displayed, the screen information of the playback control menu displayed on the second display screen 106 is no longer necessary. Accordingly, when a certain time lapses without receiving any input from the user after the user operates the control menu screen, the control menu can be adapted to disappear and the multimedia contents (or data) displayed on the first display screen 105 expand to the second display screen 106 to enable both the first and second display screens 105, 106 either to show the same multimedia contents or two or more different multimedia data simultaneously.

Figure 6:
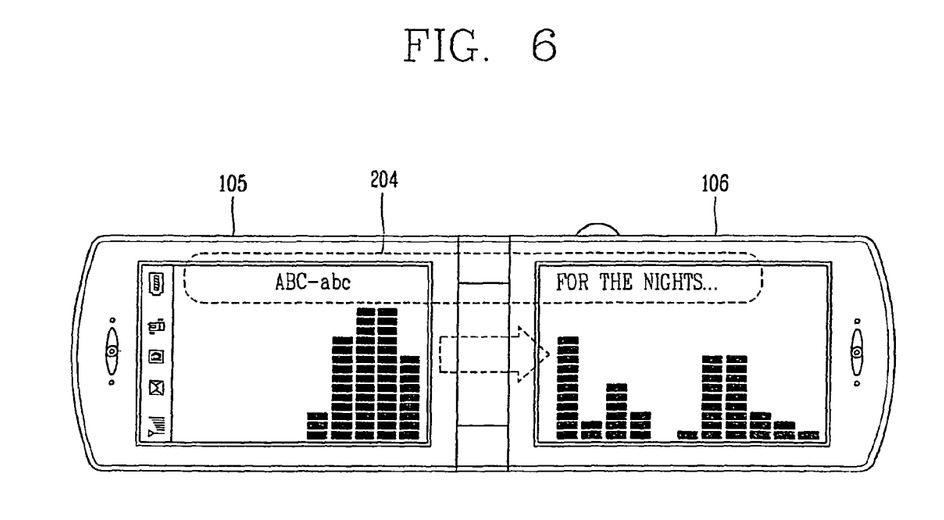
FIG. 6 is an exemplary view of the mobile terminal displaying that an main image of the first display screen expands to the second display screen in accordance with an embodiment of the present invention.
Figure 7:
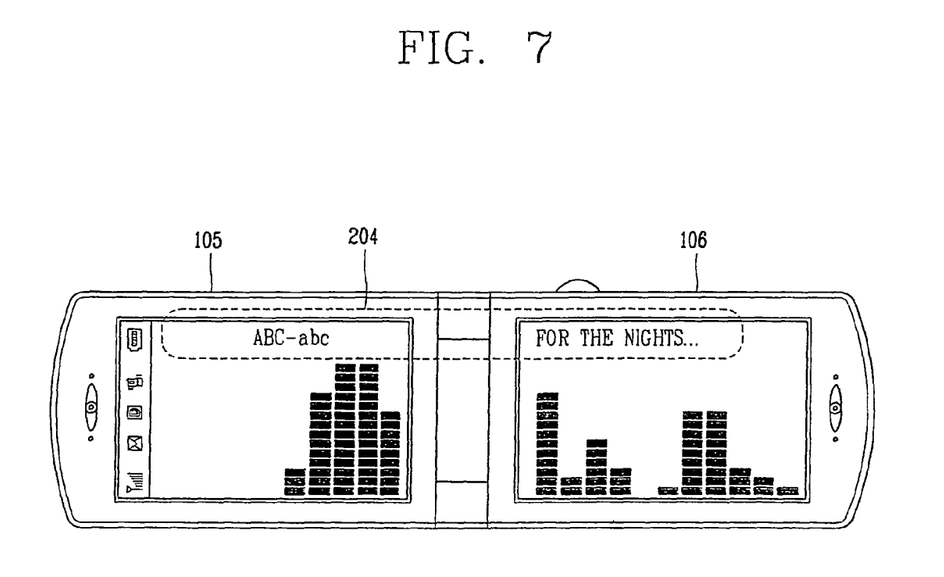
FIG. 7 is an exemplary view of the mobile terminal displaying that supplementary information regarding the multimedia contents of the first display screen expands to the second display screen in accordance with an embodiment of the present invention.
Figure 8:
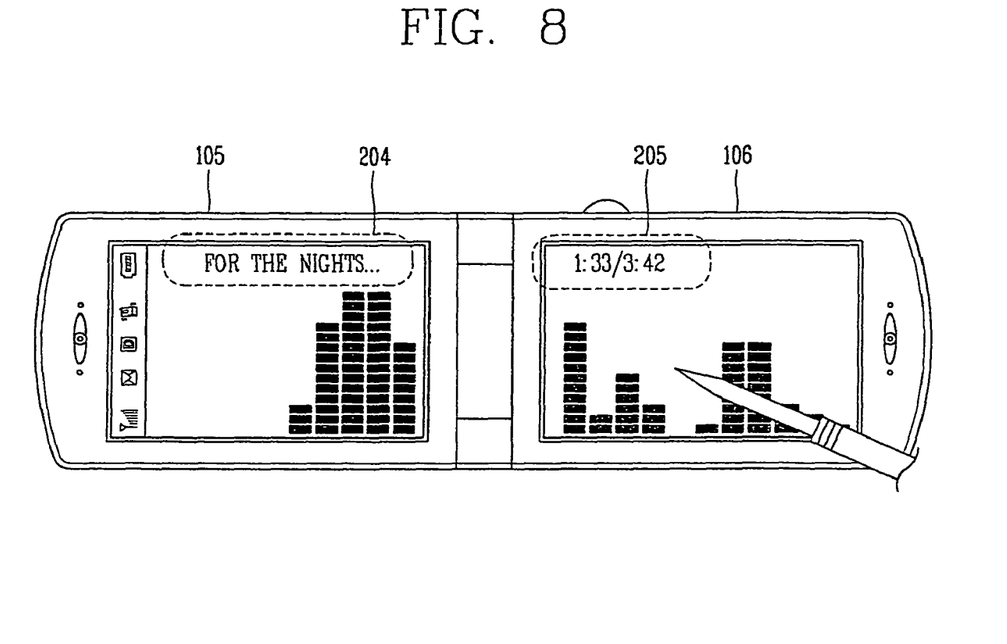
FIG. 8 shows an exemplary view of the first and second display screens respectively displaying different supplementary information regarding the multimedia contents.

FIGS. 6 through 8 show exemplary views of the mobile terminal displaying that a main image of the first display screen expands to the second display screen in accordance with an embodiment of the present invention. The main image of the first display screen 105 expanding to the second display screen 106 can comprise a zoom-in (or zoom-out) image of the original main image of the first display screen 105 to display any detail missing from the original main image as shown in FIG. 6 because the first display screen 105 may only display a portion of the original image. In addition, the auxiliary or related information 204 displayed on the first display screen 105 can be displayed on the second screen 106 in a bigger font size and the second screen 106 can display more detailed information than the initial auxiliary information 204 or different information. For example, the second screen 106 can display different information (e.g., play time) regarding the music file when the first screen 105 displays the same information (e.g., artist name and song title).

Figure 9:
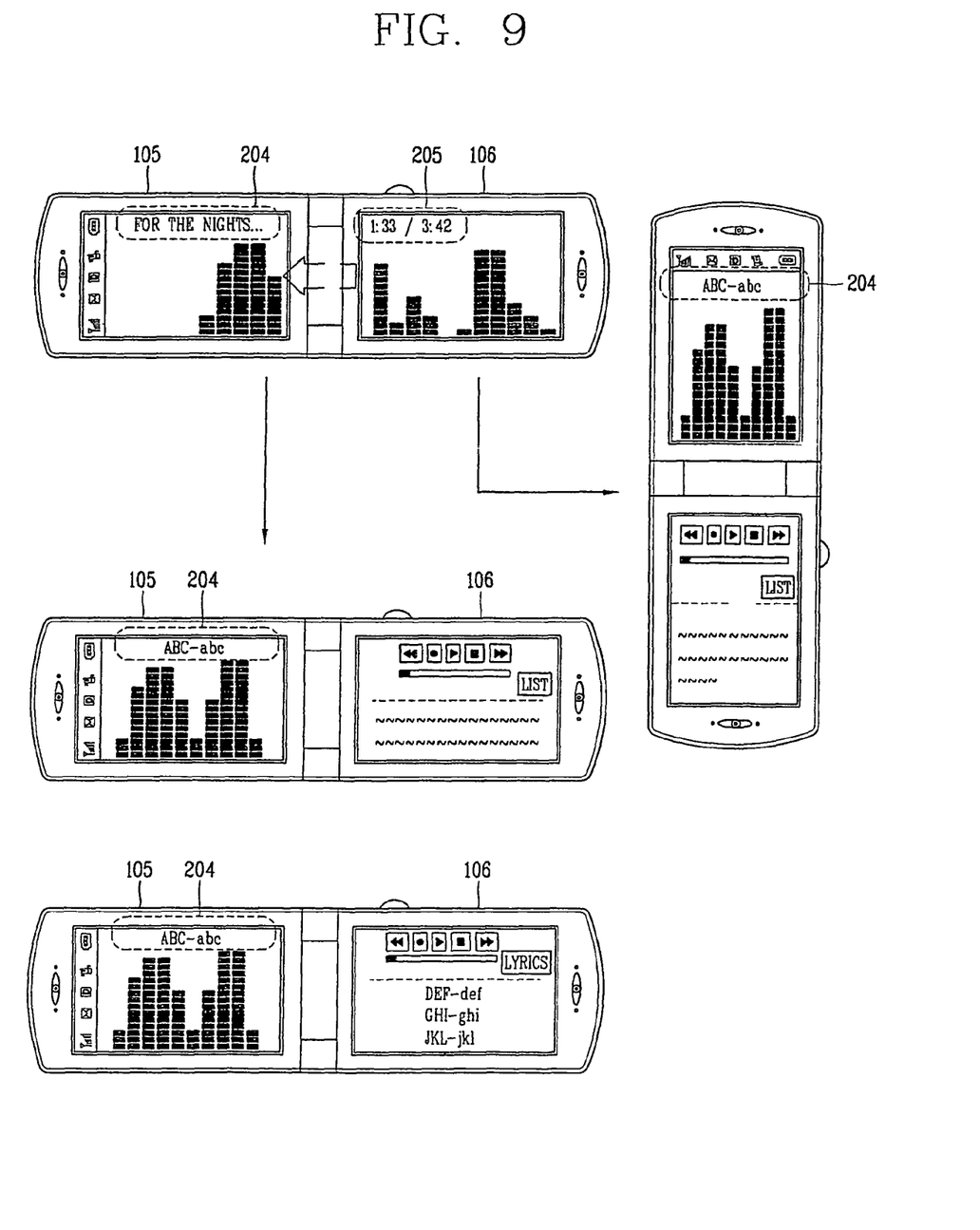
FIG. 9 shows exemplary views of the mobile terminal displaying the expanded screen information of the second display screen returning to the first displaying screen of FIGS. 6-8 in accordance with one embodiment of the invention.

As shown in FIG. 9, the mobile terminal or communicator 100 can return to display an original screen aspect ratio/size in a case that the entire body of the mobile communicator rotates with respect to its center, or a certain dedicated button or the selected area of the touch screen is actuated while the media file is expanded to be displayed on both display units. As described below, as shown in FIG. 9, the screen information display on the second display screen 106 disappears, and the first screen 105 continues to show the same main image or multimedia contents and the second display screen 106 shows the control menu screen. When the user rotates the mobile terminal 100 either clockwise or counterclockwise to have a vertical display orientation, each display screen displays screen information accordingly as shown in FIG. 9. The scope of the present invention is not limited to the feature as described above and other different display configurations can be within the scope of the present invention.

In accordance with some embodiments of the present invention, the mobile terminal can perform multitask functions while playing the multimedia contents as shown in FIGS. 10A-D. FIGS. 10 A through D show exemplary views showing a process of an event message during displaying the multimedia contents (e.g., a movie file or broadcast program). The controller 110 can control overall operations of the first and second display screens 105, 106 according to various operation modes and in particular, display an event indicator on a portion of the at least one display screen when an event occurs while processing a current operation.

Figure 10A:
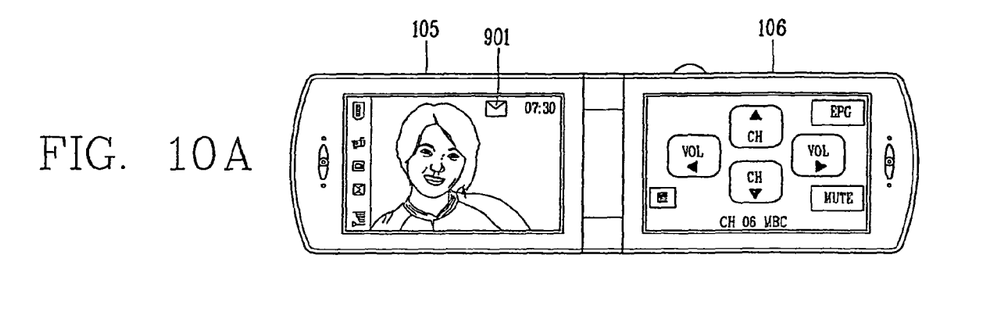

As shown in FIG. 10A, the first display 105 can display an event indicator 901 when the event occurs while the first display screen 105 is showing the multimedia content and the second display screen 106 is displaying the playback control menu for the multimedia content. The indicator 901 can provide a tactile, audible or visual (e.g., highlight, blinking) output or a combination thereof to the user when the event occurs. The indicator can be a text file, icon, image file, avatar or a photograph and the event can comprise an incoming call, an e-mail or text message, a multimedia messaging service (MMS) and a push-to-talk (PTT) message. However, the scope of the present invention is not intended to be limited to any particular embodiment such as the features as described above. Moreover, the scope of the present invention may not be limited to any specific kind of the event or indicator, and other multitask functions can be considered to include the essential features of the present invention described in this.

Figure 10B:
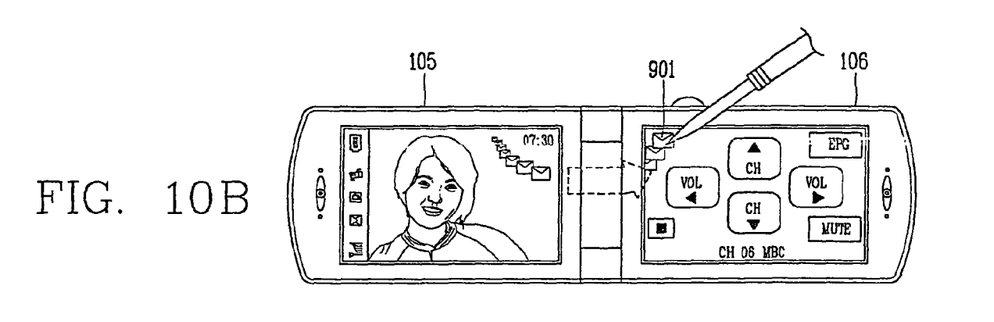

The indicator 901 is temporarily displayed on a portion of one of the first and second display screens 105, 106 and can be moved to the other area of the same display screen or the other display screen. According to one embodiment of the present invention, the indicator can be moved from the first display screen 105 to the second display screen 106, and the size or shape of the indicator can be changed during the move as shown in FIG. 10B. After the indicator moves to the second screen 106, it is displayed on a portion of the second screen.

Figure 10C:
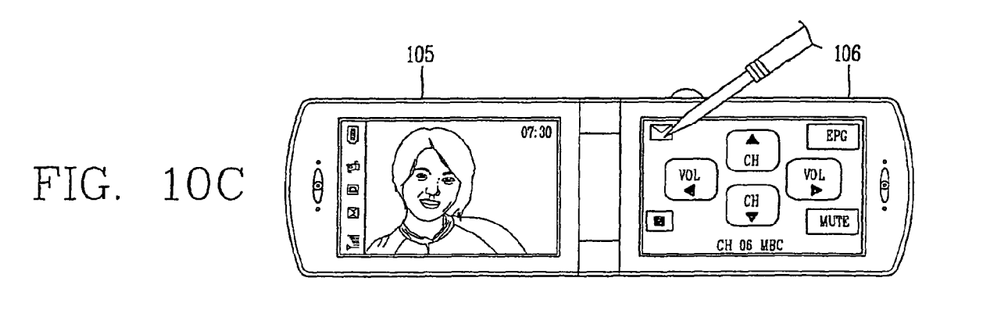
Figure 10D:
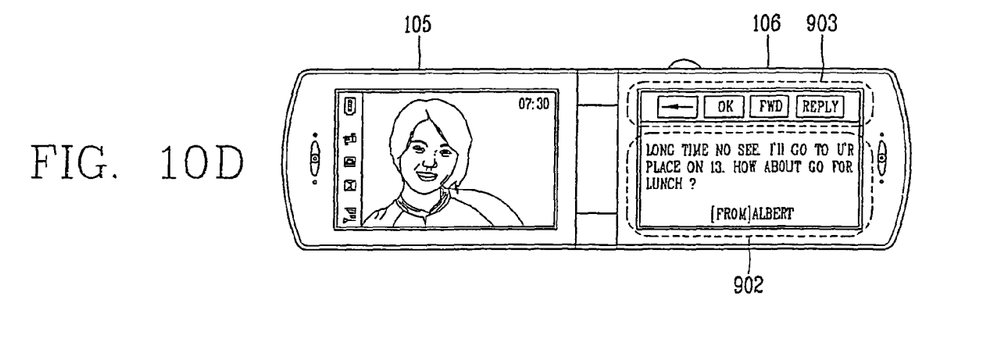

When the indicator comprises an icon for an incoming text message or e-mail, for example, and the user touches or clicks the indicator icon displayed on the second screen 106 as shown in FIG. 10C, the first display screen 105 resume to show the multimedia content and the second display screen 106 displays the a content 902 of the text message and a control menu image for handling the text message or e-mail as shown in FIG. 10D.

Figure 11A:
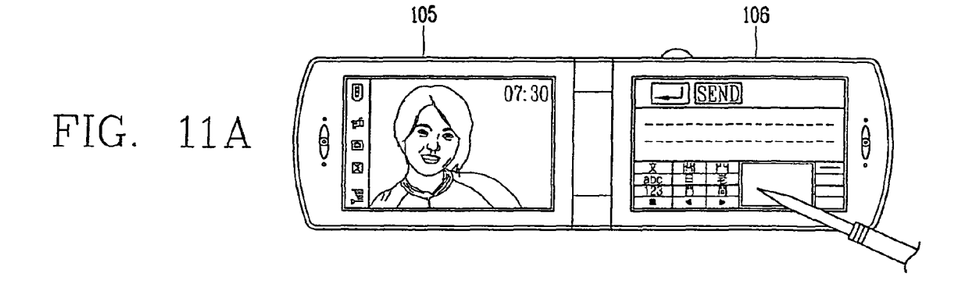
Figure 11B:
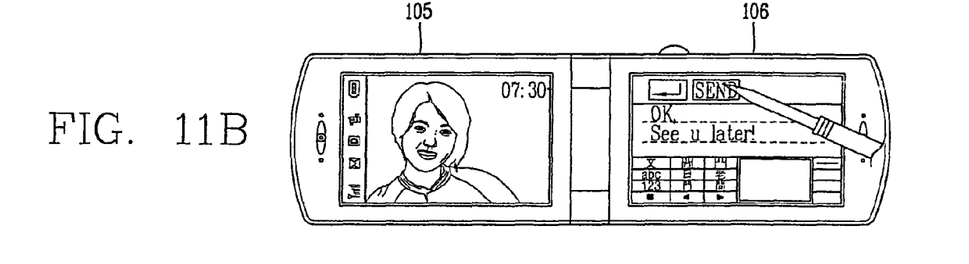
Figure 11C:
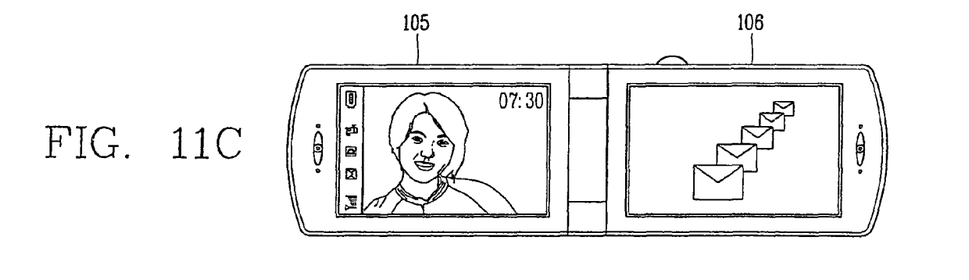
Figure 11D:
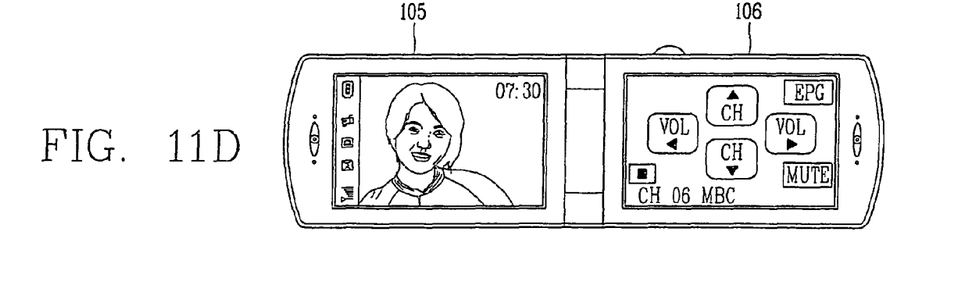

FIGS. 11A-D show exemplary views of process of sending the message of FIGS. 10A-D during the multimedia display (i.e., multitasking). The process of creating or sending a message in one embodiment of the present invention is not indifferent from the conventional message handling method. That is, when the second display screen 106 shows a screen for inputting texts to create the message in FIG. 11A, the user can send the message by actuating the SEND icon in FIG. 11B to complete the message transmission as shown in FIG. 11C. After reading the message or sending the reply to the received mail as shown in FIGS. 11A-C, the second display screen 106 can return to display the default screen information (e.g., the multimedia playback control menu screen as described above) as shown in FIG. 11D.

Figure 12:
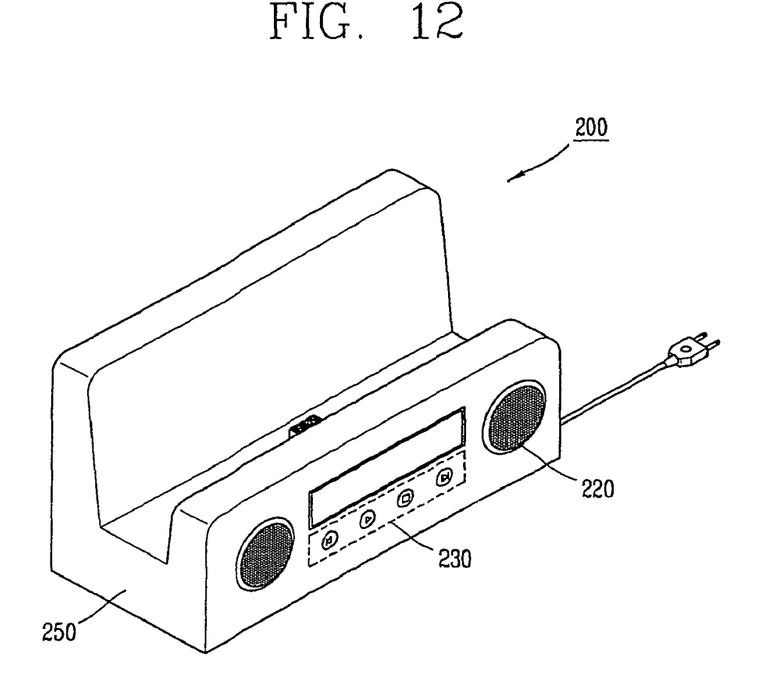
FIG. 12 is an exemplary perspective view of a cradle for the mobile terminal in accordance with an embodiment of the present invention.
Figure 13:
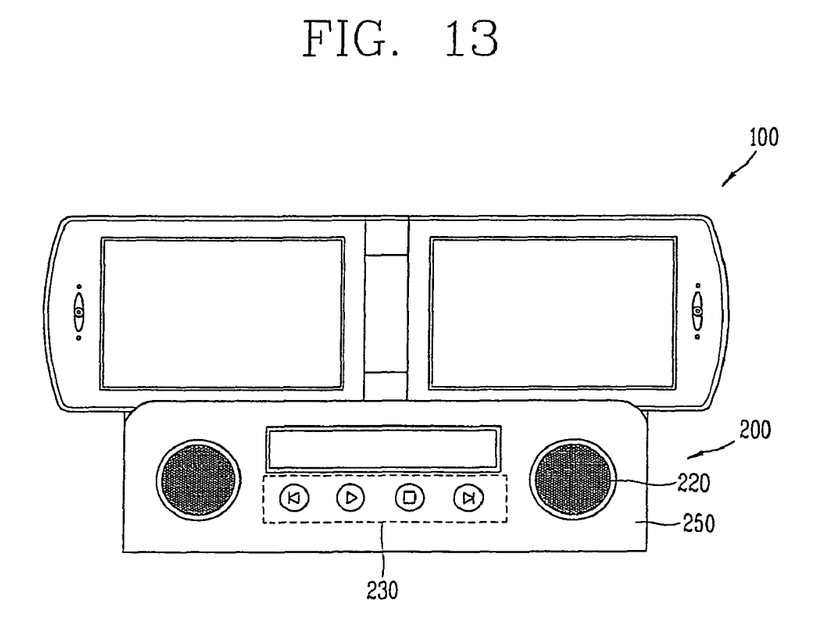
FIG. 13 is an explanatory view of the cradle of FIG. 12.
Figure 14:
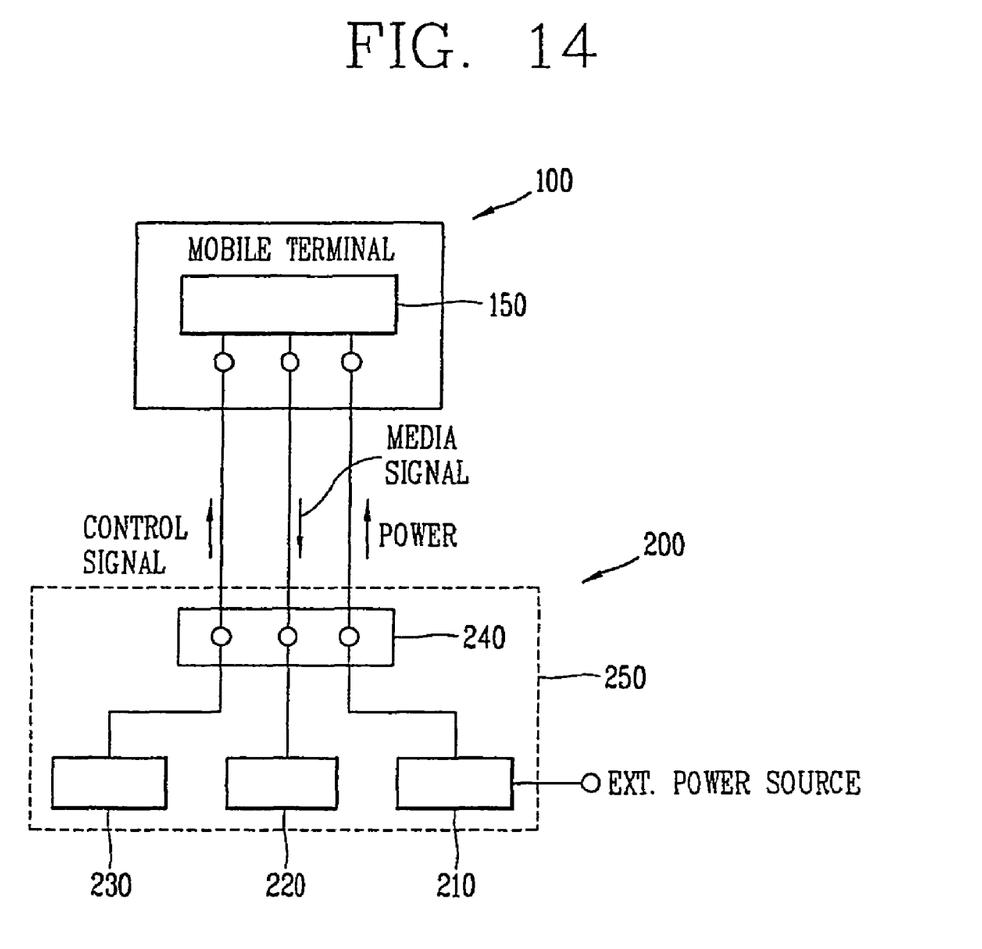
FIG. 14 is an exemplary diagram of the mobile terminal and the cradle according to one embodiment of the present invention.

In accordance with yet another aspect of the invention, the mobile terminal 100 can include a cradle 200 as shown in FIGS. 12-14 and a cradle 200 for the mobile terminal 100 can comprise a power source supply unit 210, speaker unit 220, control input units 230 for controlling functions of the mobile terminal 100, a connector 240, and a housing 250.

The power source supply unit 210 can provide external power source to the mobile terminal 100 mounted or connected to the cradle 200. The speaker unit 220 can output sounds upon receiving audio signals via the connector 240 from the mobile terminal 100 connected to the cradle 200. The control input units 230 allows the user to control a certain functions or operations of the mobile terminal 100 at the cradle 200. In particular, the user can actuate the control input units 230 to execute a certain multimedia playback control functions (i.e., "Play", "Stop", "Pause", and others). Accordingly, the user can control the playback or display of the multimedia contents or other mobile terminal programs of the mobile terminal 100 at the cradle 200 (i.e., the user doesn't have to interrupt the movie or music program displayed on both display screens in the landscape view, thus the cradle provides a minimally intrusive means to control the multimedia playback) while seamlessly providing electrical power to the mobile terminal 100.

The connector 240 can be connected to the data port 155 of the mobile terminal 100 to receive and send a certain signals (e.g., power, audio, video, control signal, and so forth) with respect to the mobile terminal 100 when the mobile terminal 100 is connected to the cradle 200. The housing 250 can provide a structural support to the cradle 200 such that the mobile terminal can be safely received or mounted by the cradle 200. In addition, the housing 250 can be configured to form such that the connector 240 is arranged at the suitable location at the cradle 200 to mate with the data port 155 of the mobile terminal 100 when connected to the cradle 200. As shown in FIG. 13, the housing 250 can be configured to form in such a way that the cradle 200 can connected to the mobile terminal or a wireless communication device that is opened flat to about 180 degrees in accordance with one embodiment of the present invention. However, the scope of the present invention is not intended to be limited to any particular cradle embodiment as described above. Moreover, the scope of the present invention may not be limited to any specific kind of the shape or configuration of the cradle and the mobile terminal, and other various body types can be considered to include the essential features of the present invention described in this.

In accordance with another aspect of the invention, the housing 250 can be installed at a car or other audio component systems. In addition, the cradle 200 can comprise a video/camera module to enable a video call or a large capacity internal battery for portability.

According to another aspect of the present invention, the mobile terminal can include more than two display screens. Further, the mobile terminal can comprise one lengthy flexible type display screen in such that the user can enjoy the multimedia contents in a landscape view without seam or break line in the middle of the screen when the terminal is opened flat to about 180 degrees.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalents of such metes and bounds are therefore intended to be embraced by the appended claims.

What is claimed is:

1. A mobile communications terminal, comprising:
a memory device configured to store multimedia contents including a multimedia related image and multimedia related information corresponding to the multimedia related image;
at least two display screens including a first display screen and a second display screen;
a sensor configured to detect a first orientation of a main body of the mobile communications terminal and a second orientation of the main body that is perpendicular to the first orientation; and
a controller operatively connected to the memory device and the at least two display screens, the controller configured to control the at least two display screens to display first and second portions of the same stored multimedia related image on both the first and second display screens such that the same stored multimedia related image is expanded across the first and second display screens when the sensor detects the orientation of the main body of the mobile terminal is in the first orientation,
wherein, when the sensor detects the orientation of the main body of the mobile terminal is in the second position, the controller is further configured to reduce a size of the displayed multimedia related image to fit only on the first display screen, to change an orientation of the multimedia related image to match the second orientation of the mobile terminal, and to display the multimedia related image only on the first display screen, and the controller is further configured to change an orientation of the multimedia related information to match the second orientation of the mobile terminal and to display the multimedia related information corresponding to the multimedia related image on the second display screen, and
wherein the controller is further configured to expand the size of the multimedia related image to again be displayed on the first and second display screens when the sensor detects the orientation of the main body of the mobile terminal is in the first orientation.

2. The mobile communications terminal of claim 1, wherein the multimedia related image is an animation related to an audio file, and the multimedia related information is text or a still image related to the audio file.

3. The mobile communications terminal of claim 1, wherein the multimedia image is a video, and the multimedia related information is text or a still image related to the video.

4. A mobile communications terminal, comprising:
a memory device configured to store multimedia contents including a multimedia related image and multimedia related information corresponding to the multimedia related image;
at least two display screens including a first display screen and a second display screen;
a sensor configured to detect a first orientation of a main body of the mobile communications terminal and a second orientation of the main body that is perpendicular to the first orientation; and
a controller operatively connected to the memory device and the at least two display screens, the controller configured to control the at least two display screens to display the stored multimedia related image on the first display screen, and to display the multimedia related information corresponding to the multimedia related image on the second display screen when the sensor detects the orientation of the main body is in the first orientation,
wherein the controller is further configured to display first and second portions of the same multimedia related image on both the first and second display screens such that the same stored multimedia related image is expanded across the first and second display screens when the sensor detects the orientation of the main body is in the second orientation, and
wherein the controller is further configured to reduce a size of the multimedia related image to fit only on the first display screen, to change an orientation of the multimedia related image and the multimedia related information to match the first orientation of the mobile terminal, to display the multimedia related image on the first display screen, and to again display the multimedia related information corresponding to the multimedia related image on the second display screen when the sensor detects the orientation of the main body is in the first orientation.

5. The mobile communications terminal of claim 4, wherein the multimedia related image is an animation related to an audio file, and the multimedia related information is text or a still image related to the audio file.

6. The mobile communications terminal of claim 4, wherein the multimedia image is a video, and the multimedia related information is text or a still image related to the video.

7. A method of displaying multimedia contents for a mobile communications terminal comprising at least two display screens including a first display screen and a second display screen, the method comprising:
  detecting, via a sensor included on the mobile terminal, a first orientation of a main body of the mobile communications terminal and a second orientation of the main body that is perpendicular to the first orientation;
  displaying first and second portions of a same stored multimedia related image on both the first and second display screens such that the same stored multimedia related image is expanded across the first and second display screens when the sensor detects the main body of the mobile terminal is in the first orientation;
  reducing a size of the displayed multimedia related image to fit only on the first display screen, changing an orientation of the multimedia related image and multimedia related information to match the second orientation of the mobile terminal, and displaying the multimedia related image on the first display screen and displaying the multimedia related information corresponding to the multimedia related image on the second display screen when the sensor detects the main body of the mobile terminal is in the second orientation; and
  expanding the size of the displayed multimedia related image to again be displayed on the first and second display screens when the sensor detects the main body of the mobile terminal is in the first orientation.

8. The method of claim 7, wherein the multimedia related image is an animation related to an audio file, and the multimedia related information is text or a still image related to the audio file.

9. The method of claim 7, wherein the multimedia image is a video, and the multimedia related information is text or a still image related to the video.

10. A method of displaying multimedia contents for a mobile communication terminal comprising at least two display screens including a first display screen and a second display screen, the method comprising:
  detecting, via a sensor included on the mobile terminal, a first orientation of a main body of the mobile communications terminal and a second orientation of the main body that is perpendicular to the first orientation;
  displaying a stored multimedia related image on the first display screen, and displaying multimedia related information corresponding to the multimedia related image on the second display screen when the sensor detects the orientation of the main body is in the first orientation;
  displaying first and second portions of the same multimedia related image on both the first and second display screens such that the same stored multimedia related image is expanded across the first and second display screens when the sensor detects the orientation of the main body is in the second orientation; and
  reducing a size of the displayed multimedia related image to fit only on the first display screen, changing an orientation of the multimedia related image and multimedia related information to match the first orientation of the mobile terminal, and displaying the multimedia related image on the first display screen and again displaying the multimedia related information corresponding to the multimedia related image on the second display screen when the sensor detects the main body of the mobile terminal is in the first orientation.

11. The method of claim 10, wherein the multimedia related image is an animation related to an audio file, and the multimedia related information is text or a still image related to the audio file.

12. The method of claim 10, wherein the multimedia image is a video, and the multimedia related information is text or a still image related to the video.

* * * * *